United States Patent
Wharton

[15] 3,662,426
[45] May 16, 1972

[54] MEANS FOR CLEANING MOTOR ROAD VEHICLE HEAD LAMPS

[72] Inventor: William Wharton, Piccotts End House, Hemel Hempstead, England

[22] Filed: Apr. 16, 1970

[21] Appl. No.: 29,050

[30] Foreign Application Priority Data

Apr. 21, 1969 Great Britain.....................20,246/69

[52] U.S. Cl.....................................15/250.22, 15/250.12
[51] Int. Cl............................................B60s 1/44
[58] Field of Search.........15/250.22, 250.3, 250.01, 250.02, 15/250.12

[56] References Cited

FOREIGN PATENTS OR APPLICATIONS

| 662,077 | 4/1963 | Canada...............................15/250.22 |
| 1,392,585 | 2/1965 | France...............................15/250.22 |
| 714,779 | 9/1954 | Great Britain......................15/250.22 |

*Primary Examiner*—Peter Feldman
*Attorney*—Burns, Doane, Swecker & Mathis

[57] ABSTRACT

Wiper means for a motor road vehicle headlamp comprising at least one wiper blade rotatable about a bearing adapted to be arranged centrally of the front glass of the headlamp, so that the wiper blade automatically keeps such front glass clean as the road vehicle on which the headlamp is mounted is driven along 7 Claims, 7 Drawing Figures

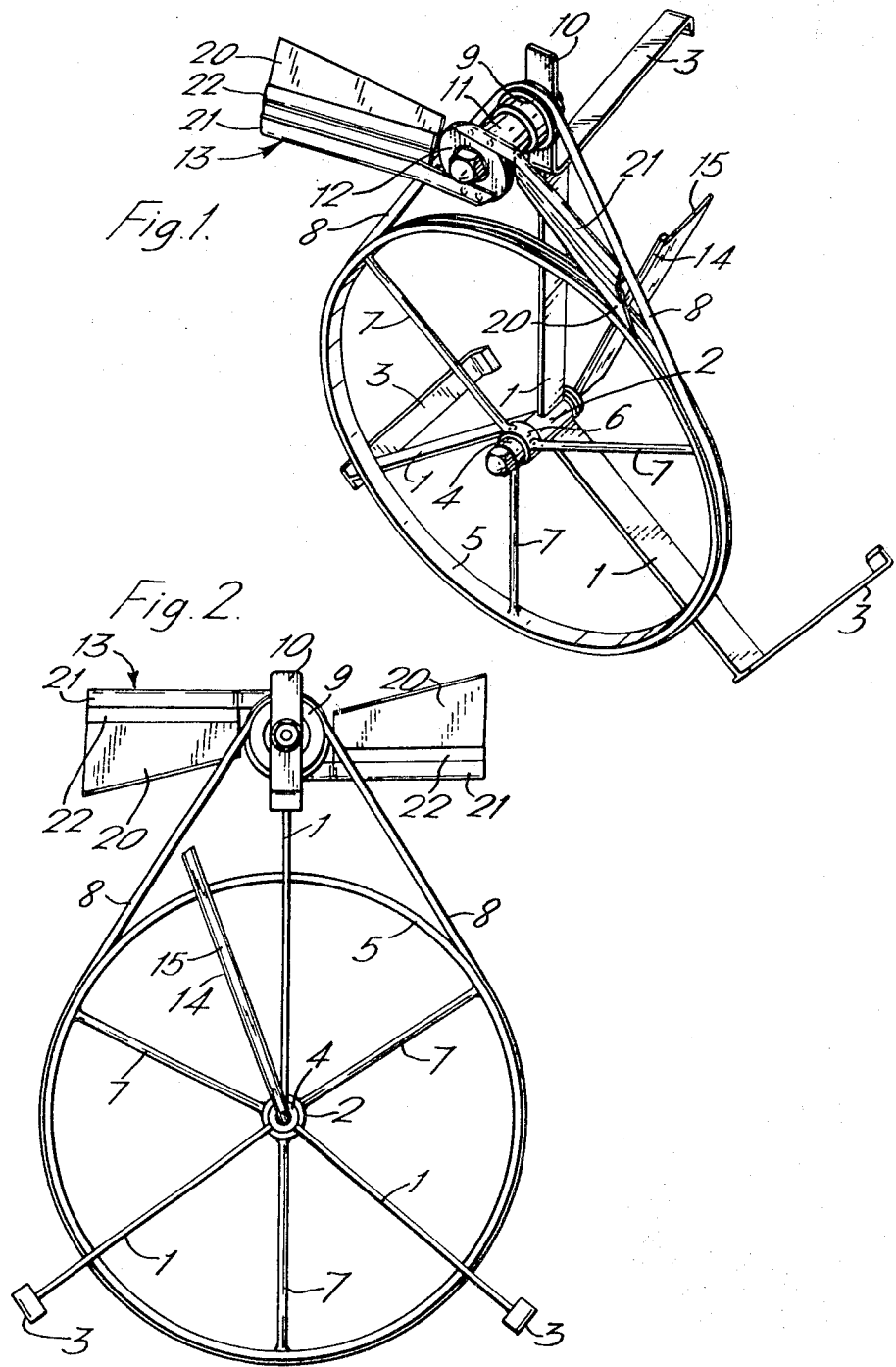

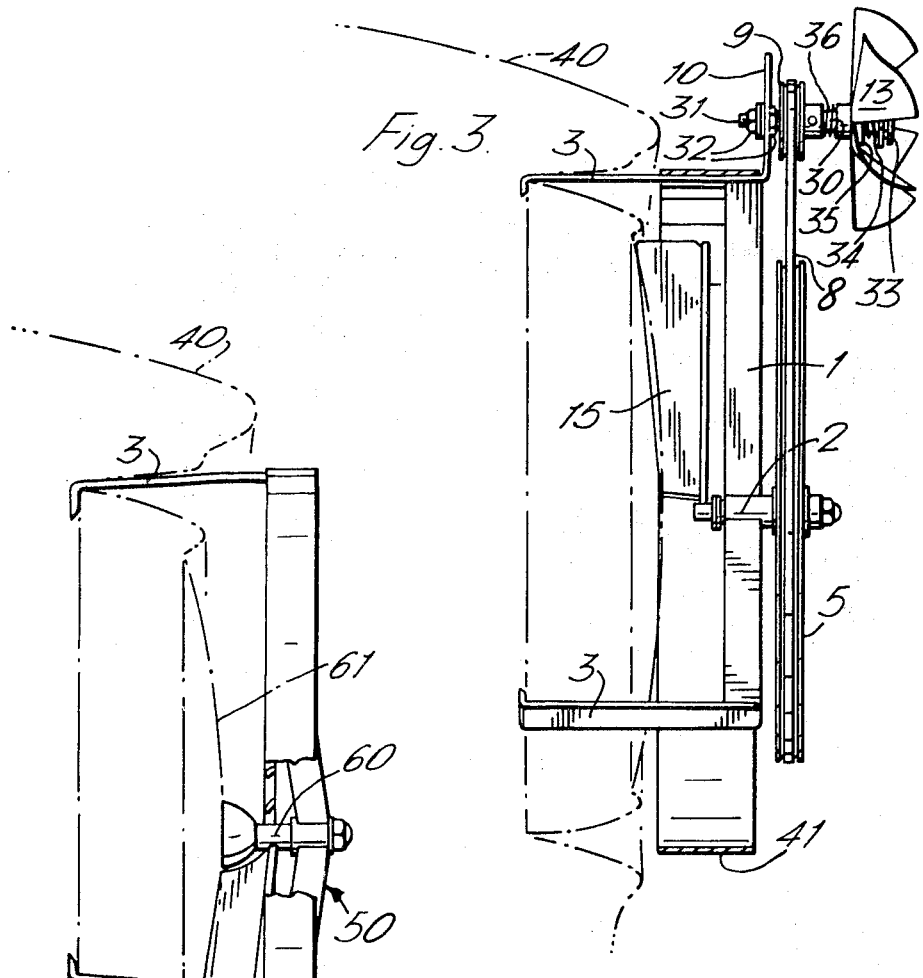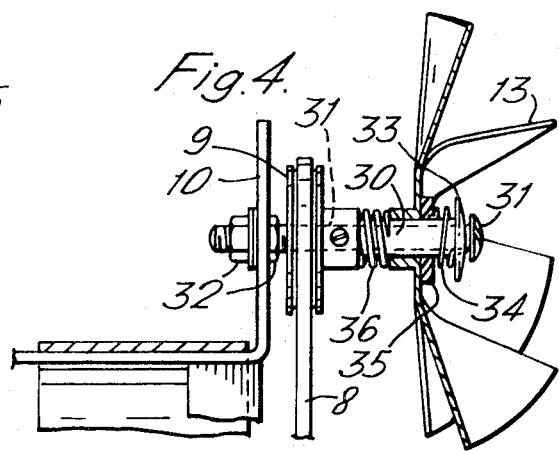

MEANS FOR CLEANING MOTOR ROAD VEHICLE HEAD LAMPS

BACKGROUND OF INVENTION

This invention relates to means for cleaning motor road vehicle headlamps.

Drivers of all types of motor road vehicles find when driving fast at night, especially on wet roads used by heavy goods vehicles, that the glass fronts of their headlamps quickly become very dirty, thus rendering the headlamps virtually useless. It is therefore necessary frequently to stop and clean the front glasses of the headlamps by hand, and this in itself, apart from anything else can nowadays be dangerous, not only for the actual driver concerned but also for other road users.

The present invention has for its object to provide for the automatic cleaning of the front glasses of motor road vehicle headlamps thereby eliminating the need for stopping to clean them by hand.

SUMMARY AND DESCRIPTION OF INVENTION

According to this invention in its broadest aspect there is provided for a motor road vehicle headlamp wiper means adapted when required to keep the front glass of the headlamp clean as the vehicle is driven along.

This invention also provides a motor road vehicle headlamp in combination with wiper means adapted when required automatically to keep the front glass of the headlamp clean as the road vehicle on which the headlamp is mounted is driven along.

The wiper means may take the form of one or more blades rotating about a bearing arranged centrally of the front glass of the headlamp, this being suitable, for example, for a circular or substantially circular front glass. For a rectangular front glass a wiper blade may be arranged to move back and forth over it.

Means may also be provided for supplying a jet of cleaning water to a headlamp front glass, in like manner to means provided in association with ordinary windscreen wipers.

Rotary or other movement of a wiper blade or blades may be imparted by a power source such as an electric motor, an air motor operated by reduced pressure in an engine inlet manifold, a motor operated from the vacuum or air pressure of a vehicle braking system, a rotary hydraulic motor or a hydraulic piston and cylinder mechanism.

Preferably, however, movement of a wiper blade is caused by a bladed rotor or windmill driven simply by the relative movement of the carrying road vehicle and the air in front of it. This has the advantage that no power is required from the vehicle, and, of course, no intervening connecting means with the power source.

Moreover, since the speed of movement of the bladed rotor or windmill may tend to undesirably increase when the relative movement between the carrying road vehicle and the air in front of it changes, resulting in an undesirable increase in the speed of movement of the wiper blade, various means are provided for controlling the speed of movement between the vehicle and the air in front of the vehicle to provide a relatively constant wiper blade speed throughout a desired operating range of vehicle speeds.

Certain arrangements in accordance with this invention will now be described in some detail with reference to the accompanying drawings, but it is to be understood that this is purely by way of example.

BRIEF DESCRIPTION OF DRAWINGS

FIG. 1 shows means in accordance with one arrangement, and

FIG. 2 shows such means in rear elevation;

FIG. 3 shows in side elevation means in accordance with another arrangement, and FIG. 4 is an enlarged fragmentary part sectional view of such means;

FIG. 7 shows such means in accordance with a fourth arrangement.

DESCRIPTION OF SHOWN EMBODIMENTS

Figure 5:
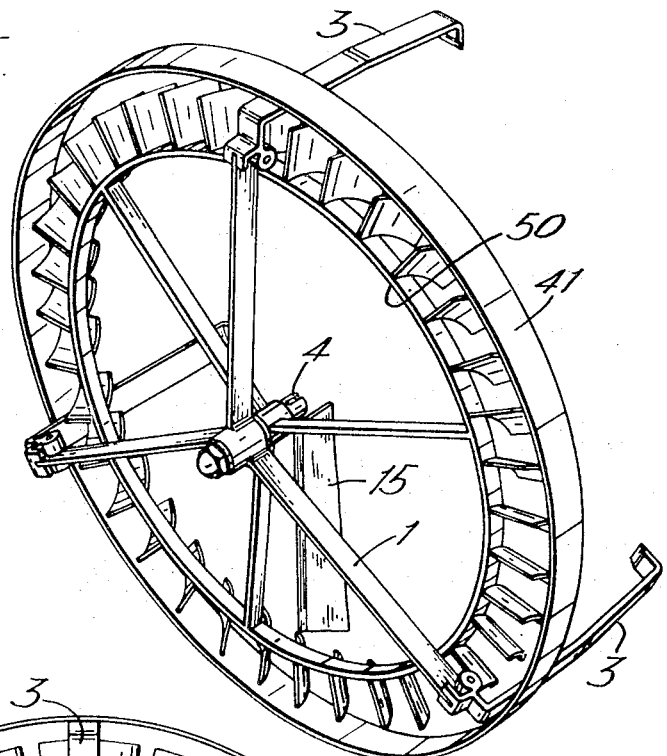
FIG. 5 shows means in accordance with a third arrangement.

The means shown in FIGS. 1 and 2 of this invention is designed for use with a road vehicle headlamp having a circular or substantially circular front glass. There is a support frame made up of three arms 1 radiating from a short tubular bearing element 2, each arm having at its outer end a rearwardly extending leg 3. The free ends of the three legs may be adapted to be clamped behind the retaining bezel of the headlamp or to be fixed to it, the arrangement being such that the tubular bearing element will be spaced from but coaxial with the center of the front glass. The legs may be surrounded by an appropriately formed protective skirt.

Rotatably mounted in the tubular bearing element is a shaft 4 on the outer end of which is fixedly mounted a large pulley wheel 5, the diameter of which is substantially equal to the diameter of the front glass of the headlamp. The pulley wheel 5 has a small hub element 6 which is actually fixed to the shaft, with a few, for example three, equally spaced thin spokes 7 radiating from it so that the minimum interference to light emitted from the headlamp will be caused. The rim portion of the pulley wheel 5 is of outwardly facing channel shape in cross section and engaged in the greater part of the channel is an endless flexible belt 8 which also passes around a much smaller pulley wheel 9 rotatably mounted on a bracket 10 extending outwardly from the outer end of one of the legs 3 of the support frame. Preferably it would be arranged that when the support frame is fixed in position this leg with the bracket 10 thereon would extend upwardly. The said smaller pulley wheel 9 is fixedly mounted on a shaft 11 rotatable in the bracket 10 and also having mounted on a forward extension thereof the hub 12 of a bladed rotor or windmill 13.

Fixedly mounted on the inner end of the shaft 4 in the central tubular bearing element 2 of the support frame is an arm 14 which extends radially therefrom in a plane parallel to the plane containing the large pulley wheel 5. Moreover, the length of the arm is slightly greater than the radius of this pulley wheel and secured to it is a rearwardly extending wiper blade 15 the free edge of which will engage the face of the front glass of the headlamp.

When means in accordance with the above described embodiment have been applied to the headlamp of a motor road vehicle and the latter is driven along, the bladed rotor or windmill 13 will be driven round by the relative movement of the vehicle and the air in front of it. This will impart drive to the smaller pulley wheel 9 and, through the flexible belt 8, the large pulley wheel 5. The wiper bearing arm 14 will thus be carried round so that the front glass of the headlamp will be continually wiped or cleaned by the wiper blade 15.

The bladed rotor or windmill 13 may be disposed within a casing or cowling which can be closed so that the rotor or windmill need not be driven unless cleaning of the front glass of the headlamp is required.

It will be appreciated that with the above described arrangement the large pulley wheel 5 will rotate much more slowly than the bladed rotor or windmill 13. In this connection it will be observed that the wiper blade 15 should desirably be carried round quite slowly, for example at about 30 to 60 revolutions per minute. At higher speeds the cleaning action of the wiper blade 15 is less effective. On the other hand if it is arranged that the wiper blade 15 rotates to give satisfactory results at low vehicle speeds, for example 15 – 20 miles per hour, then obviously the wiper blade will "race" at high speeds giving unsatisfactory results since the speed of the bladed rotor which drives the wiper blade tends to vary in direct relation to the relative movement between the vehicle and the air in front of it. Moreover, there will be undesirable wear in the relatively moving parts and the flexible driving belt 8 may well slip; should this happen then the bladed rotor or windmill 13 will "race" even more.

It is therefore desirable to provide some form of speed control for the bladed rotor or windmill 13. Thus, for example, a part of each blade of the rotor or windmill may be rigid and rigidly fixed to the hub 12. Another generally trailing part of the blade is made of flexible resilient material, for example sheet rubber. With this arrangement, as vehicle speed increases tending to increase the rotational speed of the rotor 13, the air stream causes the flexible parts of the blades of the rotor or windmill 13 to bend backwards more and more. This reduces the effective frontal area of the blades and also the component of the air flow force acting on them thereby offsetting the tendency of the speed of the bladed rotor and therefore the speed of the wiper blade to change in direct relation to the relative movement between the motor vehicle and the air ahead of the vehicle. Thus the turning effort of the rotor or windmill 13 is kept more or less constant throughout the normal operating range of vehicle speeds, e.g. above 15.20 miles per hour, and so also is the speed of rotation of the wiper blade 15.

In a modified arrangement, that is as actually shown in FIGS. 1 and 2, a movable part 20 of each blade of the rotor or windmill is rigid, being attached to a fixed part 21 by a flexible resilient hinge 22.

The means shown in FIGS. 3 and 4 includes a rotor 13 with fixed blades. The smaller pulley wheel 9 is fixed to one end of a sleeve 30 which is freely rotatable about a headed shaft 31 fixed in a bracket 10 by means of nuts 32, with suitably interposed washers or the like. On the other end of the sleeve 30 there is provided an enlarged collar 33 in which is fixed one end of a light spring 34. This spring surrounds the sleeve 30 and at its other end it is fixed in a friction collar 35 slidably mounted on the sleeve. A further stronger spring 36, also surrounding the sleeve 30, abuts, at one end, the hub of the smaller pulley wheel 9, and mounted between the other end of this spring and the friction collar 35 is the rotor 13. The rotor is slidable and rotatable about the sleeve 30. At low speeds the spring 36 holds the rotor 13 firmly against the friction collar 35 which, being connected to the collar 33 by the light spring 34, ensures that when the rotor 13 is driven round the sleeve 30 and the pulley wheel 9 rotates with it. However, as speed increases, the force of air impinging on the rotor pushes it back along the sleeve 30 compressing the spring 36. The light spring 34 does cause the friction collar 35 to follow the rotor along the sleeve 30 but the frictional force between the friction collar and the rotor is nevertheless reduced. The rotor 13 therefore slips to some extent about the sleeve and, although the speed of the rotor 15 changes in direct relation to variations in the relative movement between the motor vehicle and the air ahead of the vehicle, the speed of the wiper blade 15 remains substantially constant over a desired operating range of vehicle speeds due to the offsetting effect provided by the slippage between the friction collar 35 and the rotor 13. In this way speed control for the wiper blade 15 is provided.

In FIG. 2 a headlamp 40 is indicated, as also is a protective skirt 41 and the way in which the free ends of the legs 3 of the support frame can engage behind the retaining bezel of the headlamp.

Drive from a single rotor or windmill may be used to operate wipers on two headlamps, a single belt 8 passing partly around two large pulley wheels 5.

A support frame may be readily detachable so that it can be removed if not required for use. To facilitate storage the legs thereof may be foldable.

Attachment of a support frame may be effected by magnetic or suction cup means, but in addition an anchorage chain would preferably be provided, that is in case the support frame became detached accidentally.

Figure 6:
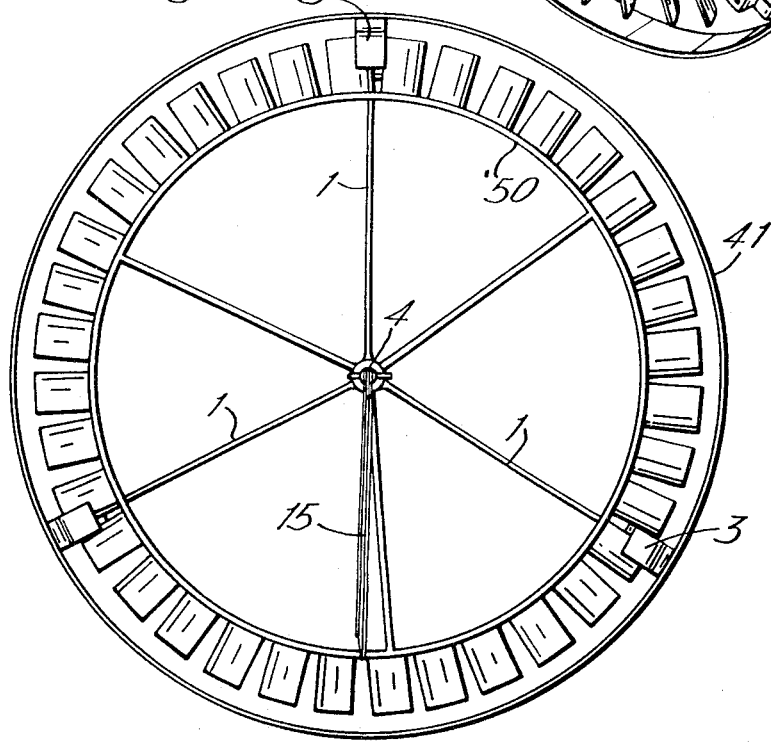
FIG. 6 shows such means in rear elevation.

The means shown in FIGS. 5 and 6 includes a wiper blade 15 carried on a shaft 4 which also carries a ring-like rotor member 50. With this arrangement there is a direct drive from the rotor member 50 to the wiper blade 15. Speed control may be effected by suitable friction means, the rotor member being, for example, braked to maintain a constant speed. Thus the rotor may be pushed backwards by the air stream against fixed friction pads (not shown) with a force which increases with vehicle speed thereby providing the desired wiper blade speed control by again offsetting the tendency of the rotor to speed up as vehicle speed increases. Such friction pads may be arranged behind the rim of the rotor member. Spring means may be provided if necessary.

Alternatively appropriate gearing elements may be interposed between a ring-like rotor member and wiper blade mounted coaxially of each other.

In the means shown in FIG. 7 a wiper blade 15 and rotor 50 are mounted on a spigot 60 fixed, for example adhesively, to the center of the headlamp glass 61. A protective skirt 41 with legs 3 engaged behind the retaining bezel of the headlamp is provided.

To cause movement of a wiper blade back and forth across the front glass of a headlamp, that is a rectangular front glass, appropriate gearing incorporating racks, gear segments and the like would be interposed between a rotor or windmill and the wiper blade.

Where movement of a wiper blade is imparted by a power source then, of course, it would be arranged that the wiper blade would be rotated or otherwise moved at the desired constant speed.

I claim:

1. Headlamp wiper means for a motor vehicle comprising:
   at least one wiper blade movable with respect to and wipingly engaging the front glass of the headlamp;
   a bladed rotor adapted to rotate responsively to relative movement between the motor road vehicle and the air ahead of the vehicle,
   said bladed rotor being drivingly connected to said wiper blade,
   the speed of rotation of said bladed rotor and therefore the speed of said wiper blade tending to change in direct relation to the relative movement between the motor vehicle and the air ahead of the vehicle; and,
   speed control means operable in response to changes in the relative movement between the motor vehicle and the air ahead of the vehicle to substantially offset the tendency of the wiper blade speed to change in direct relation to the relative movement between the motor vehicle and the air ahead of the vehicle to provide a substantially constant speed of the wiper blade relative to the headlamp throughout a desired range of vehicle operating speeds.

2. Wiper means for a motor road vehicle headlamp as claimed in claim 1 wherein the wiper blade and the bladed rotor are mounted in a support frame coaxially with a large and a small pulley wheel respectively, the two pulley wheels being drivingly engaged by an endless flexible belt.

3. Wiper means for a motor road vehicle headlamp as claimed in claim 2 wherein the speed of rotation of the bladed rotor is controlled in response to the relative movement between the motor vehicle and the air ahead of the vehicle.

4. Wiper means for a motor road vehicle headlamp as claimed in claim 3 wherein each blade of the rotor is made partially of flexible material so that it will bend backwards under the force of air impinging thereon.

5. Wiper means for a motor road vehicle headlamp as claimed in claim 3 wherein said speed control means includes friction elements adapted to cause a slowing down in the speed of rotation of the bladed rotor responsively to an increase in said relative movement.

6. Wiper means for a motor road vehicle headlamp as claimed in claim 1 wherein the wiper blade is carried on a shaft which also carries the bladed rotor, the latter being in the form of a ring.

7. Wiper means for a motor road vehicle as claimed in claim 6 wherein said speed control means includes means adapted to cause a slowing down in the speed of rotation of the bladed rotor responsively to an increase in the relative movement between the motor vehicle and the air ahead of the vehicle.

* * * * *